Nov. 25, 1969   S. COLE   3,480,029

SHUTOFF VALVE

Filed Jan. 10, 1968

INVENTOR.
SAXON COLE

BY *Edward M. Steutermann*

ATTORNEY

# United States Patent Office 3,480,029
Patented Nov. 25, 1969

3,480,029
SHUTOFF VALVE
Saxon Cole, Shrewsbury, Mo., assignor to American Air Filter Company, Inc., Louisville, Ky.
Filed Jan. 10, 1968, Ser. No. 696,856
Int. Cl. F16k 31/143, 31/363
U.S. Cl. 137—79    2 Claims

ABSTRACT OF THE DISCLOSURE

A valve to control flow of fluid through a conduit which includes a piston type valve member having an integral pilot valve to selectively divert fluid flowing through the valve and actuate the valve piston to terminate the flow of fluid through the valve.

Background of the invention

Figure 1:
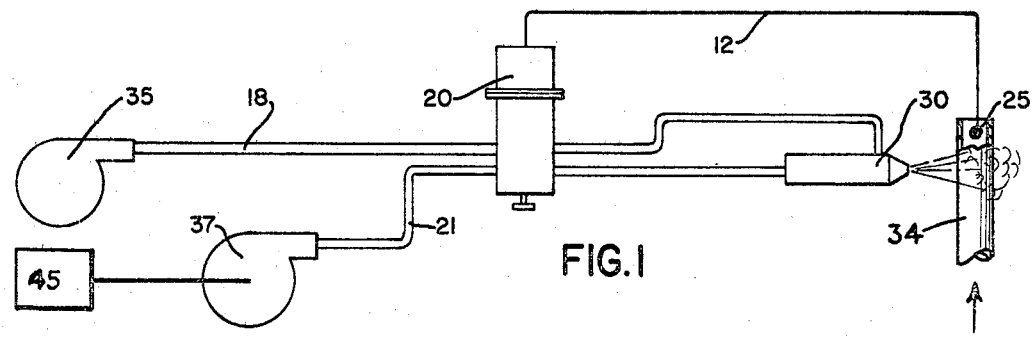

Some previous fluid flow valves have included pilot valve assemblies whereby the fluid carried by the valve provides the actuating force to operate the valve from open to closed position, and vice versa, at selected conditions. Generally, in such previous valve assemblies the pilot valve has been a part of the valve body and such arrangements are complex and expensive to manufacture. Moreover, when the pilot valve is an integral part of the valve body it is difficult to adjust the operating characteristics of the valve and in the event of damage to the pilot valve assembly it is difficult to repair the valve. In many instances the valve becomes useless when the pilot assembly is damaged.

Also, in most previous valve assemblies a significant force is required to actuate the pilot valve assembly and in many instances such valves include diaphragm pilot assemblies which are adversely affected by long periods of inactivity and varying temperatures.

Summary of the invention

The present invention provides a piston type fluid shutoff valve which is straightforward to manufacture, easy to maintain, and inexpensive to construct where movement of the piston is initiated by the pilot valve carried by the piston member itself and very little force is required to initiate such movement. It has been recognized that the valve provided by the present invention is highly responsive and fast-acting and is not adversely affected by long periods of inactivity or varying temperatures. Furthermore, the pilot valve assembly in accordance with the present invention is easily replaced when desired and is easily modified to make the valve more or less sensitive to selected conditions.

Various other features of the present invention will become obvious to those skilled in the art upon reading the disclosure set forth hereinafter.

More particularly, the present invention provides a fluid flow control valve comprising: a valve casing defining a first chamber, the casing having at least one fluid inlet and one fluid outlet; a piston member having a fluid carrying passageway means therethrough to communicate with the fluid inlet and fluid outlet means of the casing, a pilot valve chamber defined within the piston member with a fluid outlet communicating with the first chamber and a fluid inlet communicating with the passageway means where the piston is disposed within the valve casing to move longitudinally therein so the passageway means are moved into and out of register with the fluid inlet and fluid outlet aperture means of the casing; pilot valve means disposed within the pilot valve chamber to engage the outlet of the pilot valve chamber in sealing relation; means to provide flow of fluid through the valve housing from the inlet means to the outlet means when the fluid carrying passageway is in register with the casing inlet and outlet means; actuator means to displace the pilot valve means from sealing relation with the pilot valve chamber outlet so fluid carried by the passageway flows through said pilot valve chamber into the first chamber to increase pressure in the first chamber and urge the piston longitudinally through the housing so the fluid carrying passageway means is moved out of register with the casing inlet means and outlet means to terminate flow of fluid through the valve.

Figure 2:
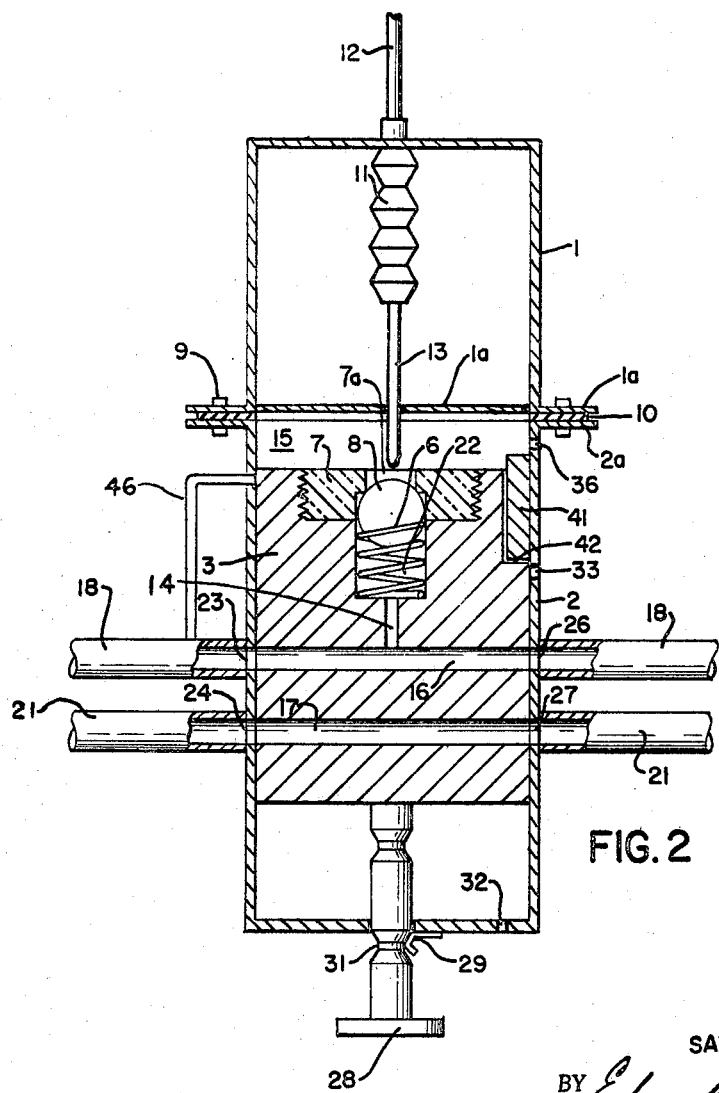

Referring to the figures:
FIGURE 1 is a schematic drawing showing a burner circuit including a valve in accordance with the present invention; and,
FIGURE 2 is a drawing, in section, of one example of a valve in accordance with the present invention.

Referring to the figures, FIGURE 1 shows a fluid heating arrangement having a burner circuit to provide a source of heat for a fluid flowing through a conduit 34 which can, for example, be a part of a heat exchanger. The burner circuit of FIGURE 1 includes a valve 20 in accordance with one example of the present invention to control flow of fuel and air to a burner 30.

Valve 20, as shown in enlarged sectional view in FIGURE 2 can include a casing 2 defining a valve chamber 14 with a piston valve member 3 disposed to move longitudinally within the chamber to terminate fluid flow through the valve in response to the temperature sensed by thermal element 25, as hereinafter described.

Casing 2 has fluid inlets 23 and 24 and fluid outlets 26, 27 where, as shown, conduits 18 and 21 respectively are connected to the fluid inlets and outlets. The conduits can carry different fluids as shown in the example of FIGURE 1 where the valve is used to control the supply of fuel and air to burner 30 and conduit 18 carries compressed combustion air while conduit 21 carries fuel. Casing 2 of the example of FIGURE 2 has one closed end and a peripheral lip 2a provided around an opposite open end is adapted to receive an actuator element 1, hereinafter described. A fluid vent 36 can be provided in casing 2 on one side of piston 3 and a second vent 32 is provided on the other side of piston 3 to avoid any limitation of the movement of piston 3 within casing 2 which might otherwise result from buildup of fluid on either side of the piston.

Piston 3 is adapted to move longitudinally within casing 2 and provides an internal pilot valve chamber 22. Piston 3 can be adapted to receive a seal 7 at the outlet of chamber 22 which can be removably affixed to piston 3, for example by cooperative threads as shown, and provides an outlet aperture 7a of selected diameter. A ball valve member 8 having a diameter greater than the diameter of outlet 7a is provided to be received by chamber 22 and spring means, for example a coil spring 6 as shown, can be provided within chamber 22 to urge ball valve 8 to sealing relation with outlet 7a of seal 7 to prevent fluid flow through outlet 7a from chamber 22.

Piston 3 provides fluid passageways 16, 17 to be selectively positioned in register with inlets 23, 24 and outlets 26, 27 respectively of casing 2 to permit fluid flow through valve 20 and a passageway 14 advantageously provides communication between chamber 22 and passageway 16, as shown. In an alternative embodiment (not shown) the relative positions of inlets 23–24, and outlets 26–27 and conduits 18–21 can be modified to permit flow through one conduit when the valve is in one position and through the other conduit when the valve is in a second position.

A valve positioning stem 28 can be attached to an end of piston 3 to extend through a cooperative aperture of casing 2 so the position of piston 3 within casing 2 can be manually selected. In the example of the figures, stem 28 includes grooves 31 to receive a detent spring member 29 attached to casing 2 so piston 3 is retained in selected position within casing 2 according to the location of the grooves of stem 28.

An internal guide vane 41 can be attached to the side of casing 2 and can be received by a guide slot 42 provided in piston 3 to prevent axial rotation of piston 3 which would cause passageways 16, 17 to move out of register with inlets 23, 24 and outlets 26, 27.

An actuator mechanism as hereinafter described is provided in casing 1 to displace ball valve 8 to actuate the pilot valve assembly. In the example of FIGURE 2 casing 1 carries a temperature or condition sensitive actuator device, for example a bellows 11 connected to a probe 13. A plate 1a covers the end of casing 1 and probe 13 extends through a cooperative aperture in plate 1a so the probe is directed toward ball 8.

Casing 1 is fastened to casing 2 by means of bolts 9, as shown, so plate 1a closes off the open end of casing 2 to form an endwall of chamber 15.

Various means can be used to actuate bellows 11 and probe 13 in response to selected conditions depending on the function valve 20 is to perform.

As shown in FIGURE 1, valve 20 can be used in a burner circuit as a high temperature safety cutoff to terminate the supply of fuel and air to the burner in the event of high temperature at a selected location. Such a burner circuit can include pressurized air source 35, for example a blower, to provide combustion air to the burner, and a fuel pump 37, connected to a fuel source 45 to provide fuel to the burner. Conduit 18 is connected to blower 35 and valve 20 and is provided to carry the compressed air to burner 30. Conduit 21 is connected to fuel pump 37 and valve 20 and is provided to carry fuel to the burner. Downstream of valve 20 both conduits are communicatively connected to the burner 30 as shown in FIGURE 1. Fluid to be heated flows through conduit 34 which is exposed to the heat generated by burner 30 and a temperature responsive element 25, for example a gas filled bulb, is advantageously disposed within conduit 34 to transmit a change in temperature in conduit 34 as an increase or decrease in pressure so bellows 11 reacts in response to the change in the temperature sensed by thermal element 25. In case of a pneumatic system, as shown, where an increase in the temperature sensed by element 25 increases the pressure in conduit 12 to expand bellows 11 probe 13 is urged to contact with ball 8 to displace ball 8 from contact with seal 7.

To initiate operation of the burner circuit, stem 28 is set to move passageways 16 and 17 into register with inlets 23, 24 and outlets 26, 27 to provide air flow through conduit 18 and fuel flow through conduit 21. Advantageously, when the burner circuit is ignited, and during normal operation, the temperature of the fluid flowing through conduit 34 is within acceptable limits and probe 13 does not contact ball 8. During abnormal operation when the temperature in conduit 34 exceeds selected limits the pressure increases in conduit 12 so bellows 11 expands to drive probe 13 to contact with ball 8. When bellows 11 has expanded a selected amount ball 8 is displaced from sealing relation with seal member 7 so air flow is diverted from passageway 16 through chamber 22 to chamber 15 whereby the pressure in chamber 15 is increased to overcome the inertia of the piston and whatever spring force may be exerted by detent spring 29 so piston 3 moves longitudinally in chamber 15 and passageways 16, 17 are moved out of register with inlets 23 and 24 and outlets 26, 27 to terminate air and fuel flow through the valve. A bypass conduit 46 can be provided, as shown, to provide high pressure gas from conduit 18 to chamber 15 when piston 3 is out of register with inlets 23, 24 so the piston is retained in such position until manually reset.

Likewise, the valve shown in the example of the figures can be used to terminate burner operation when stem 28 is pulled to move passageways 16 and 17 out of register with inlets 23, 24 and outlets 26, 27.

The invention claimed is:
1. A flow control valve comprising: a valve casing defining a first chamber, and having at least one fluid inlet and one fluid outlet; a piston member disposed for longitudinal movement in said fluid chamber having fluid passageway means therethrough to communicate with said fluid inlet and said fluid outlet means of said casing, a pilot valve chamber within said piston member having a fluid outlet communicating with said first chamber and a pilot valve chamber inlet communicating with said fluid carrying passageway means where said piston is disposed within said valve casing to move longitudinally therein so said passageway means are moved into and out of register with said fluid inlet and said fluid outlet aperture means of said housing; removable seal means defining an outlet aperture from said pilot valve chamber; pilot valve means having a diameter greater than the diameter of said outlet aperture of said removable seal means, disposed within said pilot valve chamber to engage said outlet of said removable seal means in sealing relation; spring means to urge said valve means toward sealing relation with said outlet of said removable seal means; means to provide flow of fluid through said valve housing from said inlet means to said outlet means when said fluid carrying passageway is in register with said casing inlet and casing outlet means; actuator means to displace said pilot valve means from sealing relation with said seal means outlet so fluid carried by said passageway flows through said pilot valve chamber into said first chamber to increase pressure in said first chamber and urge said piston longitudinally through said housing to move said fluid carrying passageway means out of register with said inlet means and said outlet means of said casing to terminate flow of fluid through said valve.

2. The apparatus of claim 1 wherein said actuator means includes pressure responsive bellows means connected to temperature responsive means and probe means connected to said bellows means to contact said valve member in response to increasing temperature to displace said valve means from sealing relation with the outlet of said pilot valve chamber to permit fluid flow through said pilot valve chamber from said passageway to said first chamber.

References Cited
UNITED STATES PATENTS

| 3,036,807 | 5/1962 | Lucky et al. | 251—38 X |
| 3,159,378 | 12/1964 | Haag | 251—63 X |
| 3,188,011 | 6/1965 | Turnullo | 251—63 X |

ARNOLD ROSENTHAL, Primary Examiner

U.S. Cl. X.R.

137—625.18; 251—28